UNITED STATES PATENT OFFICE.

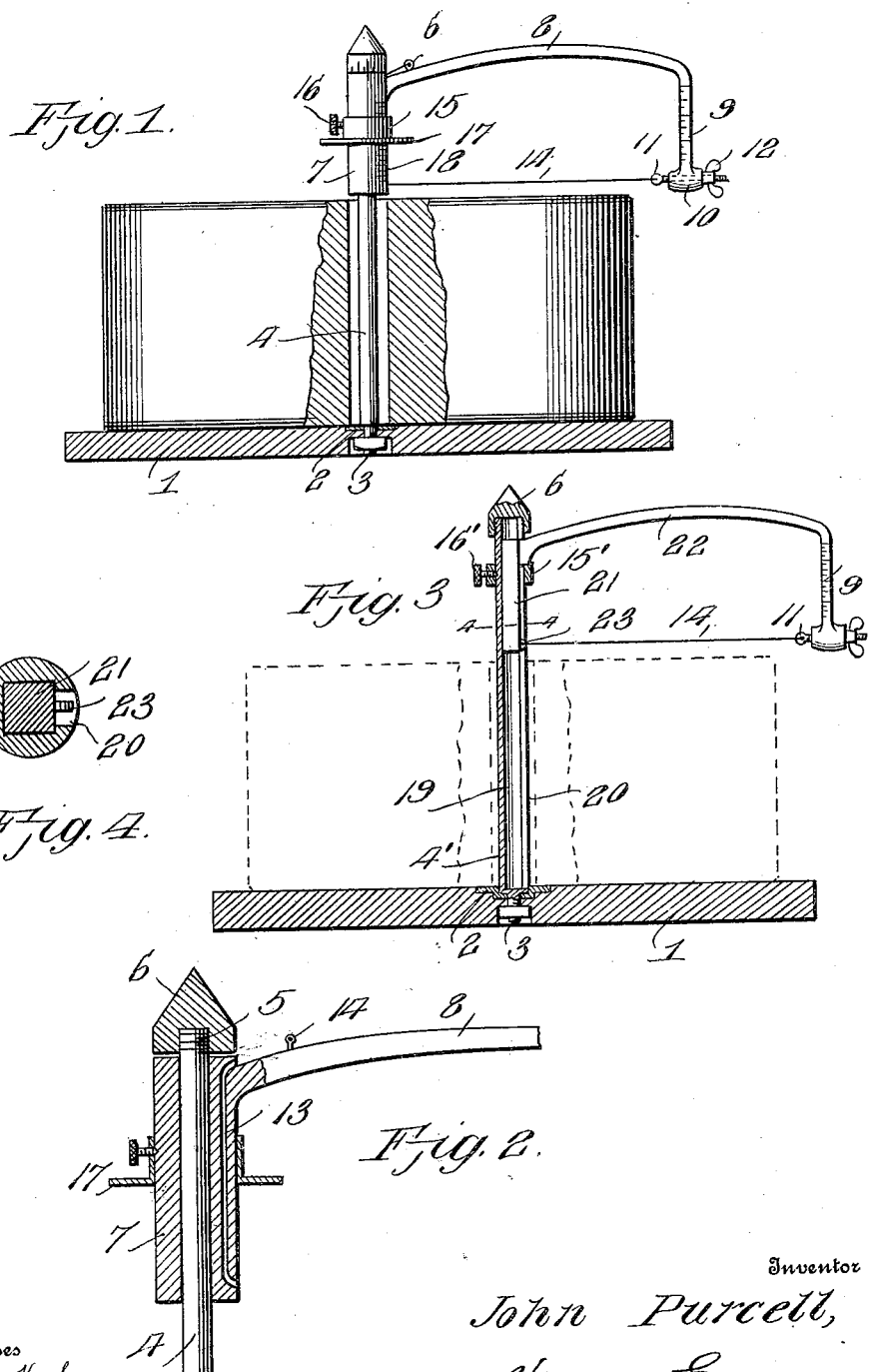

JOHN PURCELL, OF SYDNEY, NOVA SCOTIA, CANADA.

CHEESE-CUTTER.

No. 922,039.     Specification of Letters Patent.     Patented May 18, 1909.

Application filed April 11, 1908. Serial No. 426,623.

*To all whom it may concern:*

Be it known that I, JOHN PURCELL, a subject of the King of Great Britain, residing at Sydney, Cape Breton, Nova Scotia, Dominion of Canada, have invented new and useful Improvements in Cheese-Cutters, of which the following is a specification.

This invention relates to devices for cutting cheese, and the object of the invention is to provide a suitable table or support, having a centrally arranged standard, adapted for providing the cheese with a central perforation, said standard being provided with a rotatable and vertically movable arbor having a wire cutting device, the sleeve of the arbor connected with the center post being provided with a collar having a suitable flange adjustable on said sleeve whereby the depth of the cut may be regulated.

Another object of the invention is to provide a device of this character with an arbor sleeve having a series of graduations extending vertically of said sleeve and a vertical mark, and an adjustable collar upon the sleeve adapted to be positioned adjacent the graduations to determine the depth of the cut to be made upon the cheese in a vertical direction, the vertical mark upon the arbor being adapted to register with a series of graduations provided upon a pointed head of a standard, whereby the horizontal cut of the cheese may be regulated, and the approximate weight of the cut of the cheese be determined.

A still further object of the invention is to provide the standard of the device with a pointed cap, whereby an opening may be provided within the center of a cake of cheese, by removing the arbor of the device and forcing the cheese against the pointed cap.

To these ends the invention resides in the novel construction of cheese cutter, hereinafter fully described and claimed.

In the accompanying drawings, Figure 1 is a side elevation of a cheese cutting device constructed in accordance with my invention, the table or support being shown in section to illustrate the manner of connecting the standard to the table. Fig. 2 is a vertical sectional view through the upper portion of the standard and arbor. Fig. 3 is a vertical longitudinal sectional view of a modified form of my device. Fig. 4 is an enlarged horizontal sectional view upon the line 4—4 of Fig. 3.

In the drawings, the numeral 1 designates the table or base of my device. The table 1 is provided with a central aperture 2 adapted for the reception of a reduced threaded portion 3 of a vertically extending standard 4. This standard 4 is provided at its upper extremity with a threaded portion 5, adapted for the reception of a pointed cap 6. Slidably mounted upon the standard 4 is a sleeve 7, having an outwardly extending arm 8 provided with a vertical member 9, having its free end provided with a horizontally extending knob 10. The knob 10 is provided with a central bore or aperture adapted for the reception of a threaded eye bolt 11, suitably retained within the knob by a winged nut 12. The sleeve 7 is provided with a vertical channel 13, communicating at its lower end with the outer face of the sleeve in an approximately direct line with the aperture provided within the knob 10. The channel 13 communicates with the outer face of the sleeve 7, at its upper end in direct alinement with the top of the extension 8 provided by the sleeve. The extension 8 is provided with a suitable eye 14′, adapted for the reception of a cutting wire 14. This cutting wire is fed through the channel 13 and has its opposite end connected with the eye of the bolt 11. By connecting the wire in the manner described, it will be seen that the wire may not only be kept at a desired tension by the thumb nut 12, but that the wire under tension serves as an effective support for the arms 8 and 9, forming the arbor of my improvement.

Slidably mounted upon the sleeve 7 is a collar 15, having a suitable bolt 16, by which it is positioned upon the sleeve, and provided with a flange 17, which is adapted to contact with the top of the cheese, and thereby regulate the depth of the cut. The sleeve 7 is provided with a plurality of graduations 18, extending horizontally of the sleeve. By thus graduating the sleeve, it will be seen that the collar may be positioned upon the sleeve in regard to the graduations so that a desired depth may be cut into the cheese. The body of the cap 6 is also provided with a series of graduations or marks, and the sleeve is provided with a vertical graduation adapted to aline with the graduations of the sleeve. By providing the cap with these graduations, it will be seen that after the vertical cut is made within the cheese, the arbor may be swung horizontally to bring the mark upon the sleeve in alinement with the desired graduation upon the cap, the arbor raised, and the approximate size and weight of the cut of cheese readily determined. If desired the standard 4, may be also provided with vertical graduations, which may assist in obtaining the return vertical cut of the cheese.

In Fig. 3 I have shown a slight modification of my device. In this figure I have illustrated the standard 4 provided with a squared opening 19, and having a slit or opening 20 communicating with the channel 19. The vertical arm 21 of the cutting frame or arbor is of a cross sectional contour similar to that of the channel 19, and the horizontal arm 22 of the arbor is adapted to project through the opening 20. The eye 23, to which the cutting wire is attached is positioned near the bottom of the arm 21, in a direct line with the threaded eye bolt. The standard is provided with a reduced threaded extremity adapted for engagement with a suitable aperture provided within the center of the table or support and is retained in position by a suitable nut or analogous device. In this figure it will be noted that the collar 15' is slidably connected directly upon the standard 4', and the flange described in connection with the element 15 of the Figs. 1 and 2 is dispensed with. The collar 15' is provided with a suitable thumb screw 16' by which it may be retained in adjusted position upon the standard 4' and whereby the depth of the cut to be made in the cheese is regulated.

The standard may be provided with a suitable bearing plate at its point of connection with the table.

The operation of the device just described is similar to that of Figs. 1 and 2, but in this instance the standard is adapted to rotate upon the table or base.

From the above description it will be seen that I have provided a simple and effective device for cutting cheese, one wherein the vertical and horizontal cut is regulated and the approximate weight of the cut determined.

Having thus fully described the invention what is claimed as new is:

1. A cheese cutter having a base and a standard secured to the base, a bow-shaped cutter frame slidably and rotatably connected with the standard and a cutter wire for the frame.

2. A cheese cutter having a base and a standard upon the base, a bow-shaped cutter frame slidably and rotatably mounted upon the standard, an eye upon the frame for the reception of a cutter wire, the frame being provided with a channel adapted to receive the wire, and the free end of the frame being provided with a securing and adjusting element for the wire.

3. A cheese cutter having a base and a standard secured to the base, a bow-shaped cutter frame slidably mounted upon the standard, a collar having a flange movably secured to the cutter frame, a pointed cap upon the standard, an eye upon the cutter frame, a cutting wire secured to the eye, the cutter frame being provided with a channel adapted for receiving the wire, and the free end of the cutter frame being provided with a threaded element to which the wire is secured.

4. A cheese cutter having a standard provided with a pointed cap having graduating marks upon its body, a cutter arm having a sleeve upon the standard and having a mark alining with the marks upon the cap, the sleeve being provided with horizontal graduating marks, a collar having a flange slidably mounted upon the sleeve, means for retaining the collar upon the sleeve, an eye upon the cutter frame, the sleeve being provided with a vertical channel adapted for the reception of the wire, and the free end of the cutter frame being provided with a threaded element adapted for securing and adjusting the wire upon the frame.

In testimony whereof I affix my signature in presence of two witnesses.

JOHN PURCELL.

Witnesses:
JAMES E. PURCELL,
ALOYSIUS WEBB.